United States Patent [19]

Andreuccetti

[11] 4,282,591
[45] Aug. 4, 1981

[54] LIGHT CONTROL AND INDICATING DEVICE

[76] Inventor: Ilio A. Andreuccetti, 216 E. Grantley Ave., Elmhurst, Ill. 60126

[21] Appl. No.: 22,695

[22] Filed: Mar. 22, 1979

[51] Int. Cl.³ .................. G04B 47/06; G01K 13/00
[52] U.S. Cl. .................................. 368/10; 368/11; 73/339 R; 73/344; 174/66; 200/297
[58] Field of Search .......... 58/23 R, 53, 88 R, 152 R, 58/152 A; 73/339, 344, 362 AR, 339 C, 431; 364/705, 710, 557; 206/305, 306; 99/327, 332, 341; 200/297; 174/66

[56] References Cited

U.S. PATENT DOCUMENTS

| | | | |
|---|---|---|---|
| 2,392,445 | 1/1946 | Anderson | 174/66 |
| 2,763,122 | 9/1956 | Gates | 58/152 A |
| 3,177,718 | 4/1965 | Stevenson | 58/152 A |
| 3,432,611 | 5/1969 | Gaines et al. | 174/66 |
| 3,588,415 | 6/1971 | Berne | 200/297 |
| 3,772,874 | 11/1973 | Lefkowitz | 58/50 R |
| 3,832,669 | 8/1974 | Mueller et al. | 206/306 |
| 4,106,339 | 8/1978 | Baer | 73/339 C |
| 4,112,762 | 9/1978 | Turner et al. | 206/306 X |
| 4,129,125 | 12/1978 | Lester et al. | 73/344 X |

FOREIGN PATENT DOCUMENTS 2274966 12/1975 France .................. 58/152 A

Primary Examiner—Vit W. Miska
Attorney, Agent, or Firm—Paul H. Gallagher

[57] ABSTRACT

A light control and indicating device including a main component adapted for mounting in a cavity of a wall, and a cover plate fitted thereover. The main component includes a frame or holder on which are mounted a plurality of operating members (referred to below) and those members have indicating elements exposed through, or slightly projecting through, openings in the cover plate. Those operating members include: a switch for connecting with control wires leading to electric lights in the room in which the device is located; a temperature sensor or thermometer having a sensing element in a body of air exposed to the room but shielded from cold air in the spaces in the wall, and including a read-out dial; a location-indicating signal light; and a time piece having a read-out dial.

3 Claims, 8 Drawing Figures

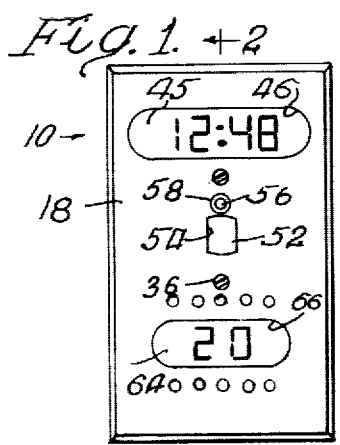
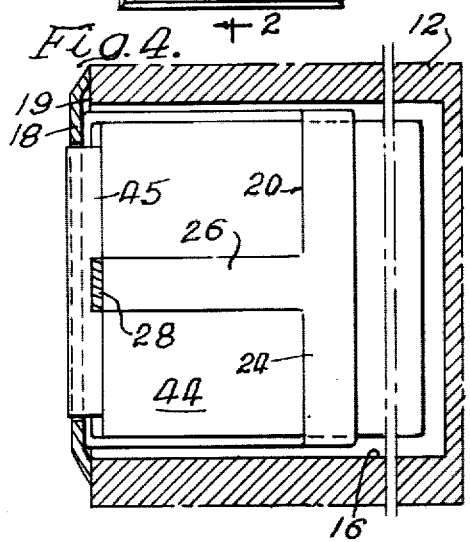
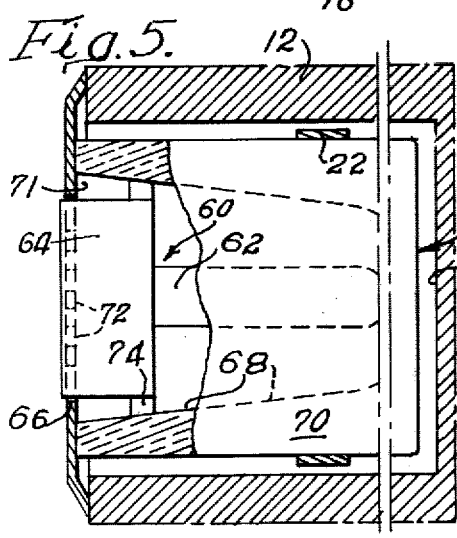
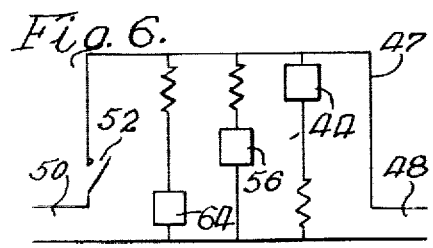
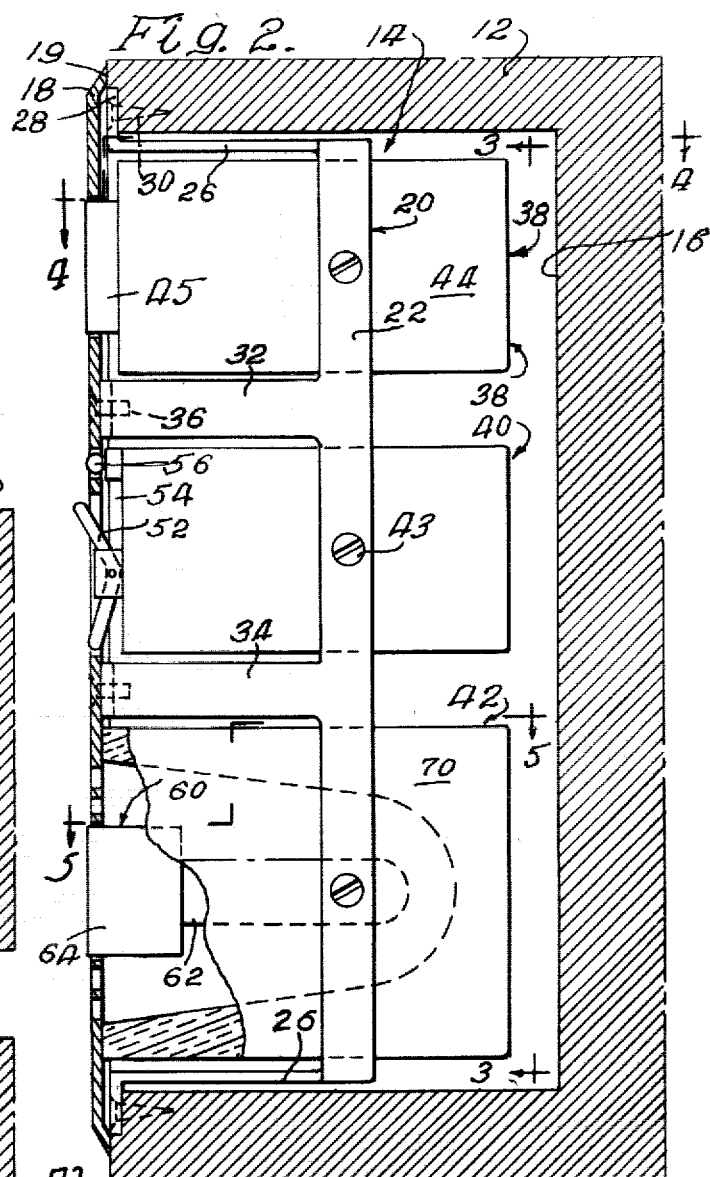
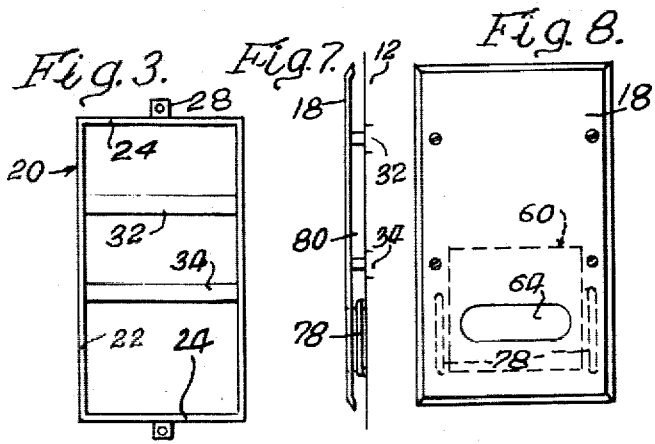

LIGHT CONTROL AND INDICATING DEVICE

OBJECTS OF THE INVENTION

A main object of the invention is to provide a control and indicating device that may be substituted for a conventional light switch, such as is ordinarily used in the home and which performs the usual function of such a light switch in providing manual control of the light, but with additional functions of indicating the time of day and temperature, and indicating the location of the device, in the dark.

Another object is to provide a device of the foregoing character which is of simple and compact construction so as to occupy a space similar to that of the usual light switch now in use, and which includes a main component which can be mounted in a cavity in the wall, and a cover plate thereover, and forming a cover to the cavity in the wall but exposing elements of the members in the main component.

Another object is to provide an assembly of the foregoing character which can be substituted for an ordinary light switch such as now used in the home, by the simple expedient of disconnecting a pair of wires in the light switch and connecting corresponding wires in the present device, and thus can be easily put in place by an unskilled person.

A further object is to provide a device of the foregoing character made up of members or elements that are presently standard items, or shelf items, and therefore simple in construction and inexpensive.

Still aother object is to provide a device of the character just immediately referred to, which is of such compact design that it can be put out in a simple and compact and complete package, facilitating marketing the device, and the user obtaining it and putting it in place.

Still another object is to provide a device of the charforegoing character in which the temperature sensor or thermometer, although included in the fabricated structure of the main component, and although positioned behind the cover plate and generally invisible, is subjected to the temperature of the air in the room in which the device is mounted, but insulated from air, whether hot or cold, in spaces in the wall.

DESCRIPTION OF A PREFERRED EMBODIMENT

In the drawings:

FIG. 1 is a front view of the assembly of the device in place in a wall;

FIG. 2 is large scale sectional view taken at line 2—2 of FIG. 1;

FIG. 3 is a view of the frame member of the main component oriented according to line 3—3 of FIG. 2;

FIG. 4 is a view taken at line 4—4 of FIG. 2;

FIG. 5 is a view taken at line 5—5 of FIG. 2;

FIG. 6 is a diagram of a portion of the electrical circuit utilized in the assembly;

FIG. 7 shows portions of a modified form of device, including an edge view of a cover plate and a portion of a wall on which it is mounted; and FIG. 8 is a semi-diagrammatic front view of the arrangement of FIG. 7, taken from the left of FIG. 7.

Referring in detail to the drawings:

FIGS. 1 and 2 show the device indicated in its entirety at 10 mounted to a wall 12 in the room in which the device is used. The device includes a main component 14 fitted in a cavity 16 in the wall, and it includes a cover plate 18 mounted to the main component and closing the cavity and covering the main component except certain elements of the latter exposed through openings in the cover plate, as described in detail hereinbelow.

The wall 12 insofar as the present invention is concerned is of indeterminate material, as ordinarily found in a house or other structure, having suitable strength and heat insulation properties and the cavity 16 opens outwardly through a front surface 19 of the wall exposed to the subject room.

The main component 14 includes a frame 20 (FIGS. 2 and 3) of any suitable shape and design and forming a "box" which is mounted in the cavity and serves as the means for mounting other members or elements of the device. The specific shape and construction of the frame may be as desired, but in the present instance it is of unitary construction and includes vertical side elements 22, top and bottom elements 24, the latter having forwardly or outwardly extending fingers 26 terminating in vertical lugs 28, the latter being fitted to the inner surface of the wall, and screws 30 secure the frame to the wall. The frame also includes an upper and lower forwardly extending loops 32, 34, these loops termintong adjacent the inner face of the wall and serving as the means to which the cover plate 18 is secured, by means of screws or bolts 36.

The main component 14 includes three structural subcomponents, or units, or members 38, 40 and 42 mounted in the frame 20, positioned between the side elements 22 and secured in place by suitable means such as screws 43. The upper unit 38 includes a timepiece 44 of known kind which includes an LED read-out element 45 preferably of reduced size extending forwardly through an aperture 46 in the cover plate 18. This timepiece may be of the digital type, and showing the digits in the read-out element 45 indicating the time. The details of the timepiece need not be described, but the read-out device is connected in circuit as represented in FIG. 6.

The main component 14 includes circuitry indicated generally at 47 shown in FIG. 6, being connected with lead-in wires 48 representing the wires from the electrical source usually provided to a switchbox. The device is put in operation by merely mounting it in the wall and connecting the wires 48 to the posts to which the lead-in source is connected. Wires 50 lead to the lights in the room.

The unit 40 includes a main swtich 52 which is utilized for turning the lights in the subject room on and off, and serves the same function as the usual switch in switchboxes heretofore known. The switch 52 may be of any suitable structure and is of course manually actuated and is exposed through an aperture 54 in the cover plate 18.

Incorporated in the sub-component 40 is a signal light or pilot light 56 which also is exposed through an aperture 58 in the cover plate. The signal light 56 serves the purpose of indicating the position of the assembly in the room to aid a person in locating it in the dark.

The main component 14 furthermore includes as a sub-component a thermometer or temperature indicator 60. This member includes a sensing element or bulb 62 and a LED read-out element 64 exposed through an aperture 66 in the cover plate. The temperature indicator is mounted bodily, principally in a cell 68 in a block 70 of heat insulation material. The specific structure of this block may be as desired, but all of the walls thereof, except the front, are of insulation material and they insulate the temperature indicator from all air in the structure of the wall, but expose the sensing element to the air in the subject room. To this end the front end or side is open as indicated at 71, and fitted to the cover plate, and the cover plate is provided with a plurality of air circulation holes 72. These holes are preferably spaced apart a maximum extent in vertical direction, and enable the air in the room to pass into the cell at the lower portion of the latter, and to pass out at the upper portion. This air entering into the cell is of substantially the same temperature as that in the room and thus the temperature of the room is accurately indicated. The physical structure of the temperature indicator may be as desired, and as shown in FIG. 5 may have lateral extensions 74 mounted to the wall of the block 70.

FIGS. 7 and 8 show an alternate arrangement of temperature indicator. While the structure described above includes the temperature sensing element 62 within the cell 68, the arrangement of the FIGS. 7 and 8 provides for sensing elements 78 disposed in a passage 80 formed between the cover plate and the wall 12, the cover plate being spaced outwardly from the wall to provide that passage. The air in the room flows through the passage and impinges on the sensing elements. In this instance the cell block 70 is not included.

The device of the invention is a self-contained arrangement, for simple replacement of the usual switchbox heretofore known, and includes a main switch as in the previously known switchbox, and in addition the time indicator 45, the temperature indicator 64 and the signal light 56. The arrangement is compact and is merely put in place by connecting the circuitry to the source and the lights in the room. Mounting of the main component is completed upon insertion of the screws 30, and mounting of the whole assembly is completed by putting the cover plate in place and securing it by the screws 36. The device is inexpensive relative to the components incorporated and the facilities provided, and insofar as mounting it in place is concerned, it requires no greater effort or time in the original construction of a house than in utilizing switchboxes heretofore known. Where it is desired to use this device to replace switchboxes heretofore known, the home owner, many times non-skilled, or semi-skilled, can easily put the device in place by merely connecting the wires of the device with the electrical source of the circuit provided.

I claim:

1. A unitary and self-contained device, for mounting in a cavity in the wall of a subject room, the wall having a surface exposed to the room and the cavity opening through that wall surface to the room substantially through its own full transverse area, and the wall having an interior structure defining the surface of the cavity, and the cavity being dimensioned and constructed for mounting therein of a conventional light switch, said device comprising,
a main component and a cover plate,
the main component including,
(a) a frame forming a box extending into and positioned in the cavity and including lugs fitted to the wall adjacent said exposed surface and secured to the wall,
(b) a plurality of sub-components mounted in said frame, the sub-components including,
(1) a light switch having a manually actuating element disposed closely adjacent the plane of said exposed surface of the wall,
(2) a block disposing the cavity, composed of heat insulating material continuously on all sides except an open front side, forming a cell opening through said open front side, the block being positioned with its open front side closely adjacent the plane of said exposed surface of the wall, a thermometer in the cell with a sensing element extending into and disposed entirely in the cell and a visual indicating element disposed closely adjacent the plane of said surface of the wall, the cover plate having apertures communicating with the cell at vertically spaced positions respectively adjacent the top and bottom of the cell to enable flow of air from the room through the cell in sensing engagement with the sensing element and to facilitate the free flow of such air,
the cover plate being mounted to said frame over the cavity and secured to the frame, and being flat and essentially of planar form and lying close to said surface of the wall and blending into that surface, the cover plate having openings receiving the actuating element of the light switch, and the indicating element of the thermometer, and those elements thereby being exposed through those openings, and the elements substantially filling those openings and terminating closely adjacent the outer surface of the cover plate, the cover plate, except for said apertures, otherwise completely covering the cavity.

2. A device according to claim 1 wherein,
said sub-components include also a timepiece having a time-indicating element disposed closely adjacent the plane of said exposed surface of the wall,
said openings in the cover plate including one receiving the time-indicating element of the time piece, and the latter is thereby exposed through that opening and substantially fills it and terminates closely adjacent the outer surface of the cover plate.

3. A device according to claim 1 wherein,
one of said sub-components includes an electric lamp disposed closely adjacent the plane of said exposed surface of the wall,
said openings in the cover plate including one receiving said electric lamp, and the latter is thereby exposed through that opening and substantially fills it and terminates closely adjacent the outer surface of the cover plate.

* * * * *